July 21, 1942.   A. E. RATHBUN   2,290,614
METHOD OF MAKING REINFORCED POROUS RUBBER CUSHIONS
Filed Oct. 12, 1938   2 Sheets-Sheet 1

INVENTOR
Alan E. Rathbun
BY
ATTORNEY

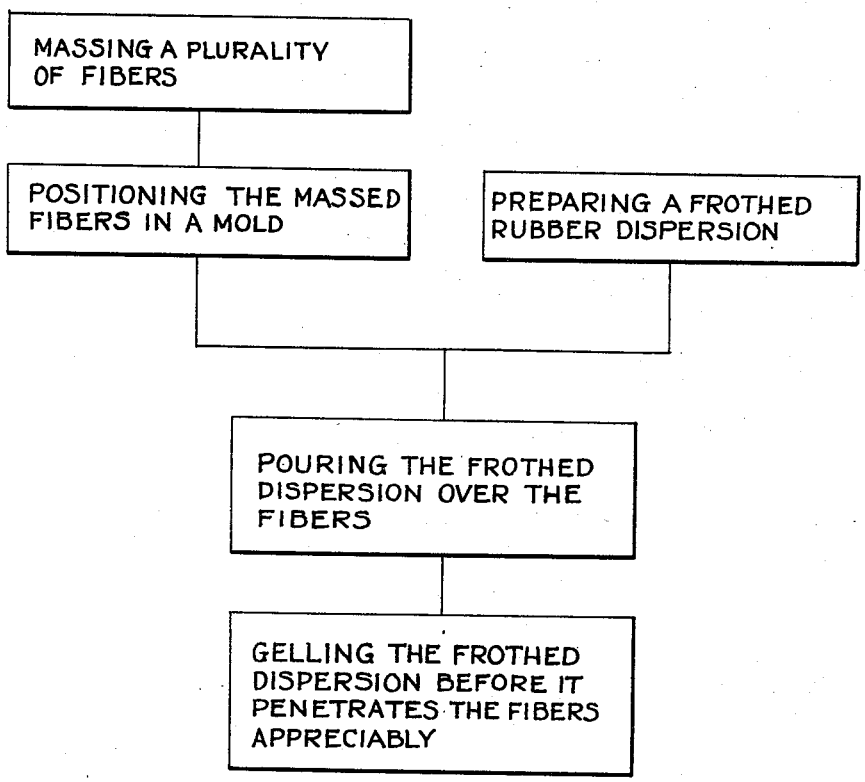

Patented July 21, 1942

2,290,614

UNITED STATES PATENT OFFICE 2,290,614

METHOD OF MAKING REINFORCED POROUS RUBBER CUSHIONS

Alan E. Rathbun, Akron, Ohio, assignor to The Firestone Tire & Rubber Company, Akron, Ohio, a corporation of Ohio Application October 12, 1938, Serial No. 234,607

4 Claims. (Cl. 18—53)

This invention relates to seat cushions, more especially to porous rubber cushions which are reinforced with fiber.

Porous rubber cushions have been found to be quite satisfactory for general cushioning purposes. However, the best cushions are made from latex-rubber, which is relatively expensive compared to other cushioning material. Thus, the cost of the best porous rubber cushions prevents use of these cushions for many purposes to which they otherwise are well adapted.

The general object of this invention is to reduce the cost of porous rubber cushions made from latex without detracting from the comfortable, resilient support provided thereby. Another object of the invention is to reduce the amount of rubber required to form a cushion by reinforcing the rubber cushion with upholstery fiber. A further object is to provide a method of making a reinforced porous rubber cushion. Other objects will be manifest from the specification.

Reference is now directed to the accompanying drawings, in which:

Figure 6 is a flow sheet illustrating method steps of the invention.

Broadly speaking, the present invention comprises molding a mass of upholstery fiber to a predetermined shape and then positioning it in a mold having the desired contour. A vulcanizable aqueous dispersion of rubber is frothed and then poured over the molded fiber mass. Finally the rubber dispersion is gelled and vulcanized to form a cushion of the desired shape. The compression exerted upon the upholstery fibers in forming them to a predetermined shape and the pressure thereon when they are in a mold determines the penetration of the rubber dispersion into the mass, as will hereinafter appear.

Figure 1:
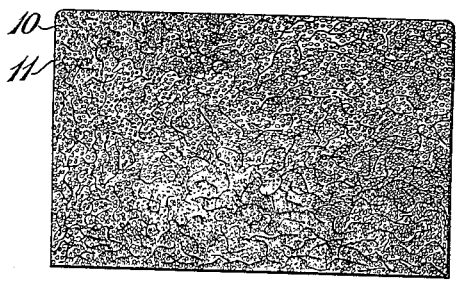
Figure 1 is a transverse section of an embodiment of the cushioning material of the invention.

A rectangular porous rubber block 10 having numerous fibers 11 embedded therein, is shown in Figure 1. The fibers 11 are relatively short, as shown, and may be made from any suitable upholstery fibers, such as curled hair, pig's bristles, or the like, and even steel wool in some cases. These fibers are formed into a loose mass approximately the size of the rubber block to be produced. Then a vulcanizable aqueous rubber dispersion, of any suitable composition, is frothed in manner well known to the art, and the frothed rubber composition poured over the mass of fibers 11, after placing the fibers in a mold having the desired contour. Since the fibers are very loosely associated, the frothed rubber dispersion, even though slightly viscous, readily flows through the fibers and forms a body conforming to the mold contour. Figure 1 shows that the fibers are heterogeneously positioned in and extend in all directions throughout the rubber 10 whereby suitable reinforcing thereof is effected.

Figure 2:
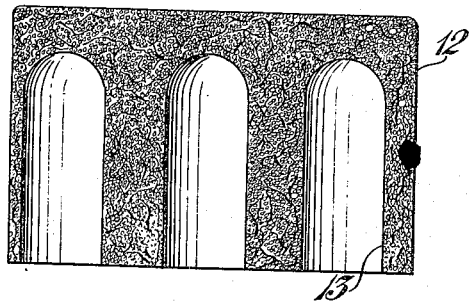
Figure 2 is a transverse section of a seat cushion formed from the material of Figure 1.

Figure 2 shows a fiber-rubber composition, similar to Figure 1, formed into a cushion 12. Thus a plurality of cells 13 are formed in the cushion 12. Obviously in this instance the cushion 12 is formed in a mold having a plurality of cylindrical projections thereon so that the cells 13 result in a finished cushion. Of course, the fibers 11 are massed so as to mate with the mold used and the fibers may be originally massed when placing them in the mold, if desired.

Figure 3:
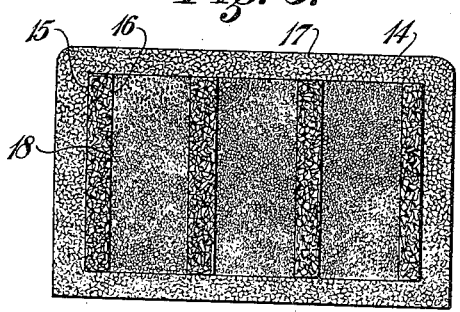
Figures 3 and 4 are transverse sections of modifications of seat cushion of the invention.

A different type of seat cushion, 14, is shown in Figure 3. Here a preformed body of fibers 15 has a plurality of vertically extending cylindrical holes 16 extending therethrough. The fibers 15 are placed in a mold spaced from all of the margins thereof. Then when a frothed rubber dispersion is poured onto the fibers 15, a porous rubber body 17, which covers the top, bottom and sides of the fiber body 15 and which has integral cylindrical projections 18 thereon extending through the hole 16, is formed. Thus the upper and lower portions of the cushion 14 are identical and have similar reinforcement whereby the cushion can be reversed and subjected to load from either top or bottom thereof. The fiber body 15 has the fibers tightly packed adjacent each other so that the viscous, frothed liquid rubber dispersion does not run into the fiber body to any appreciable extent but deposits, or gels, upon the surface thereof, as shown. Of course, the rubber 17 may only cover the top and sides of the fiber body 15 in some instances.

Figure 4:
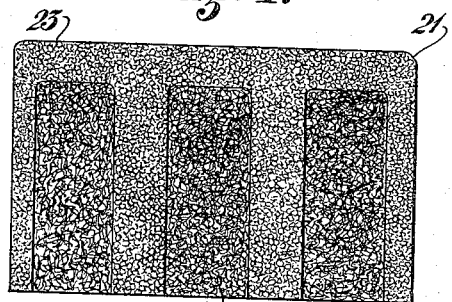

A cushion 21 which is substantially the reverse of the cushion 14, is shown in Figure 4. The cushion 21 consists of a plurality of vertically extending, dense cylindrical masses of fiber 22 which are surrounded on the sides and top by a rubber mass 23. The rubber has not penetrated the fiber 22. The cushion 21 is made reversible by covering the bottom thereof with the rubber mass 23, which result may be secured by positioning the fibers slightly above the base of the mold in which the cushion is produced so that the rubber dispersion placed in the mold can cover both the tops and bottoms of the masses of fibers.

Figure 5:
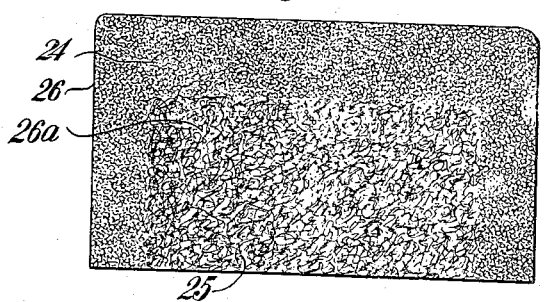
Figure 5 is a transverse section of a modified form of cushioning material of the invention.

Attention is now called to Figure 5 in which a cushion 24 comprising a mass of fibers 25 and a porous rubber covering layer 26 is shown. Here the fibrous mass 25 forms the core, or base of the cushion and is covered on the sides and top by the rubber layer 26. The fiber mass 25 has the fibers thereof packed rather tightly, but not as compactly as in the cushion shown in Figure 3 and Figure 4. Thus, some of the frothed rubber dispersion drops, or flows a short ways into the fibrous mass before gellation occurs. This is illustrated in Figure 5 by the threads 26a of rubber formed upon the inner surfaces of the rubber layer. These threads 26a act to bind the fibers and rubber together, also some of the fibers will extend a short ways from the preformed mass and engage with the rubber layer to aid in binding the two together.

In making any of the cushion material of the invention, I prefer to use a vulcanizable latex composition which contains a delayed action coagulant, such as ammonium sulfate. Usually the composition is frothed, the coagulant added, and then the resultant froth is poured, or permitted to flow into a mold of the desired contour. A preformed mass of fibers is positioned in this mold in any suitable manner, such as by pins or rods, and the frothed rubber dispersion either coats upon or flows through the mass of fibers, as hereinbefore described. In all events, gellation occurs before any appreciable breakdown of the foam occurs so that a porous rubber mass is obtained which then should be vulcanized by inserting the mold into hot water, or by any other suitable method. In certain instances the fibrous mass may be free for limited upward movement in the mold. Then the fibers float on the surface of the rubber dispersion and rise up as the dispersion is poured into the mold until their movement is restrained. Pouring further rubber dispersion into the mold covers the sides and top of the fiber mass. Still another method of making the cushion of the invention is to pour a frothed rubber dispersion into a mold and then to press a preformed mass of hair into the dispersion by applying a cover to the mold, or by other means, whereby the rubber is forced into, onto, or around the fibrous mass, depending on the shape thereof.

A feature of the invention is that the volume of rubber required to form a seat cushion having desirable load supporting characteristics is reduced. This is effected by frothing the rubber a greater amount than for non-reinforced cushions whereby more air is beaten into the rubber dispersion and less rubber results in a unit volume of cushion. Of course, this rubber is weaker than rubber having less air therein so that fibers are embedded therein to reinforce the rubber cushion. Also, the size of the cells formed in the cushion may be increased to reduce the volume of rubber used, the cells being either void as in Figure 2, or filled with fibers (Figure 3). In all embodiments of the invention, the fibers are bound to the rubber mass whereby no packing of the fibers occurs, since the rubber body springs back to its original shape after load removal and pulls the fibers back with it. It will be noted that the rubber layer covering the fibrous masses is sufficiently deep to conceal the reinforcing effect of the fibrous masses in the cushion from a person sitting thereon, or being supported thereby. When the fibrous material extends to the surface of the cushioning material, then the fibers are so loosely associated that their presence is not noticeable to a person carried thereon.

In the specification the term "rubber dispersion" is meant to include both natural and artificial rubber dispersions, as well as dispersions of synthetic rubber or rubber-like materials.

In accordance with the patent statutes, I have prepared a written description of my invention, although it will be understood that modification may be resorted to without departing from the scope of the invention as defined in the appended claims.

What is claimed is:

1. That method of producing a cushion comprising forming a group of fibers to a loose mass substantially smaller than the desired cushion, placing the massed fibers in a mold of cushion size, the fibers being spaced from the edges of the mold, frothing an aqueous dispersion of rubber, pouring the frothed dispersion onto the massed fibers to form a layer thereover and to fill the mold, closing the mold, and gelling the frothed dispersion to obtain a porous rubber layer over the massed fibers, a portion of the frothed rubber running into the massed fibers prior to gellation whereby threads of rubber extend from the rubber layer to secure same to the massed fibers.

2. That method of producing a cushion comprising forming a group of fibers to a loose mass substantially smaller than the desired cushion, placing the massed fibers in a mold of cushion size, the fibers being spaced from the edges of the mold, frothing an aqueous dispersion of rubber, limiting the vertical movement of the massed fibers, pouring the frothed dispersion around the fibers which float upon the dispersion until restrained against further upward movement, covering the entire surface of the massed fibers with frothed rubber dispersion, and setting the frothed rubber dispersion to form a porous rubber coating on the surface of and surrounding the mass of fibers.

3. That method of producing a cushion comprising massing a plurality of fibers, positioning the massed fibers in a mold spaced from at least one extremity thereof, preparing a frothed rubber dispersion, pouring the frothed rubber dispersion over the massed fibers, and gelling the frothed rubber dispersion before it penetrates the massed fibers appreciably whereby a cellular rubber cushion having a mass of fibers embedded therein is formed.

4. That method of producing a cushion comprising forming a plurality of fibers to a mass substantially smaller than the desired cushion, placing the massed fibers in a mold spaced from the sides and top thereof and retaining the fibers in such position, preparing a frothed rubbed dispersion, pouring the frothed rubber dispersion over the massed fibers to fill the mold completely and form a layer over the top of the massed fibers, gelling the frothed rubber dispersion before it penetrates the massed fibers appreciably, and vulcanizing the gelled rubber whereby a cellular rubber cushion having a mass of fibers embedded in the lower portion thereof is formed.

ALAN E. RATHBUN.